April 11, 1967 G. O. LARSON 3,313,042
MOLECULAR MODELS
Filed Jan. 26, 1965 3 Sheets-Sheet 1

INVENTOR
G. O. LARSON
BY William W. Stokes
ATTORNEY

April 11, 1967 G. O. LARSON 3,313,042
MOLECULAR MODELS
Filed Jan. 26, 1965 3 Sheets-Sheet 2
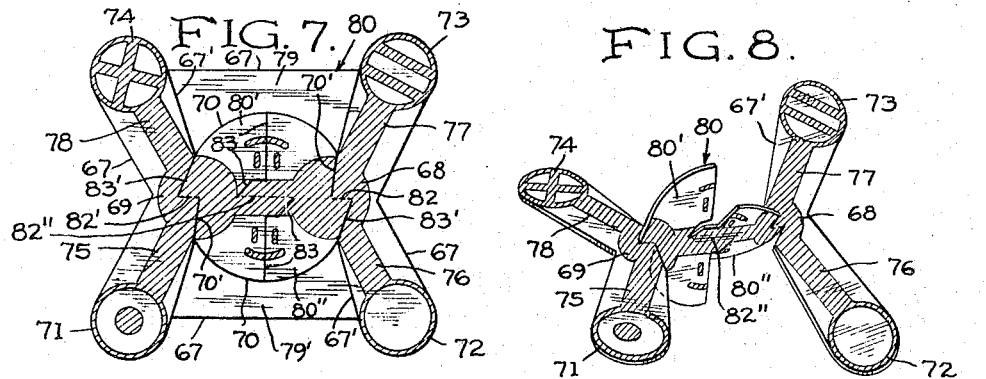
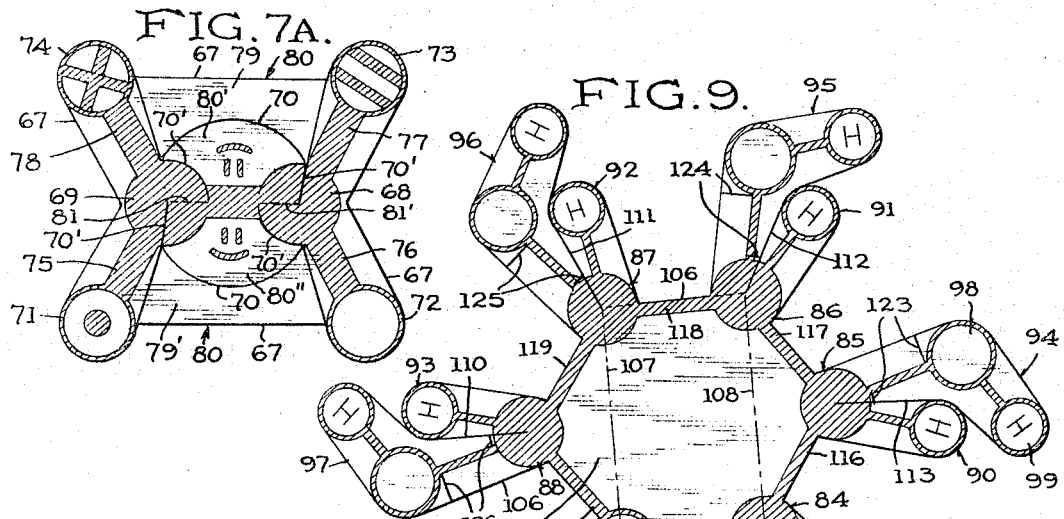
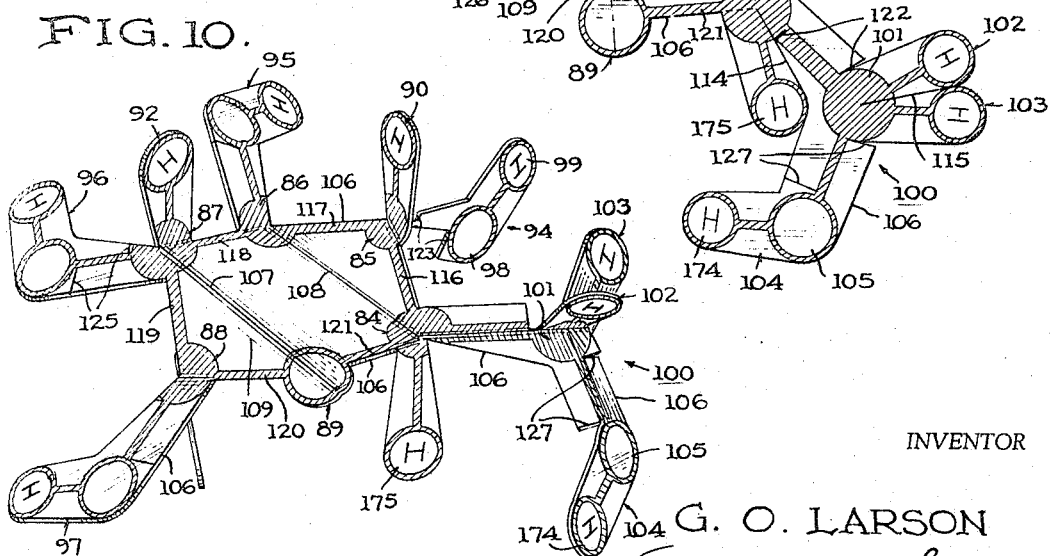
INVENTOR
G. O. LARSON
BY William W. Stokes
ATTORNEY April 11, 1967 G. O. LARSON 3,313,042
MOLECULAR MODELS
Filed Jan. 26, 1965 3 Sheets-Sheet 3

INVENTOR
G. O. LARSON
BY William W. Stokes
ATTORNEY

United States Patent Office 3,313,042
Patented Apr. 11, 1967

3,313,042
MOLECULAR MODELS
Gustav O. Larson, 2504 Filmore St.,
Salt Lake City, Utah 84106
Filed Jan. 26, 1965, Ser. No. 428,040
13 Claims. (Cl. 35—18)

This invention relates to materials for representing chemical structures and in particular to novel and improved models useful for representing atomic and molecular structures in the field of chemistry and a method for preparing such models.

In recent years with the ever increasing knowledge of the major role that stereochemical factors play in determining chemical reactivity and physical properties of molecules, molecular models have become an integral part of the research scientists' tools and an indispensable aid to the lecturing professor. There are at present two well known basic types of molecular models used; the ball and rod type which enables one to study the skeletal relationships of atom positions and valence bond angles and the solid space or ball on ball type which is designed to observe the exterior contours of the molecule. Both types are widely used and are available commercially. The former employs atoms composed of wooden, or like material, balls with drilled holes to receive pegs which represent bonds. The latter type uses balls for atoms which have been flattened on the surface areas where snap-fastener bond connectors are located.

The molecular and atomic models of this invention are useful in demonstrating structural phenomena of chemical compounds and structural concepts to those interested in the field of chemistry. A primary utility of the stereomodels of the present invention is that they may be utilized to illustrate the skeletal and planar relationships of atom positions and valence bond angles and, optionally, the exterior contours of the entire molecule. Hence, according to this invention, special advantages of other types of prior art models can be embodied in a single set of stereomodels which are simple and inexpensive. Another important utility of the molecular models of this invention lies in their value of affording individual demonstrations of the stereochemical effects of the various structures, now known to those skilled in the chemical arts, to beginning students of chemistry. These demonstrations are ordinarily conducted by college and university instructors and professors to groups or classrooms of students who are usually in their most informative years for the proper learning of the basic aspects of stereochemistry. This invention permits individual instruction in this area.

In the molecular stereomodels now available to those desiring to use the same, a practical problem of economics has arisen. The high cost of purchasing the models now on the market, such as the "ball and stick" type, often limits the number of model sets which can be purchased by any one individual or school. This problem is especially acute in the smaller schools where such stereomodels are desired. The result of these prohibitive costs is that such schools usually purchase only single sets of such models for use by all of their instructors and professors. Thus, the individual students must be content to merely witness the instructor or professors use of the models from a distance. Hence the learning of such stereochemical effects by use of stereomodels is very visibly affected.

The stereochemical models of the present invention overcome these and other disadvantages now borne by the prior art stereomodels. Thus the present invention provides stereomodels which are ideal for individual instruction to the student of all phases of the stereochemical aspects of molecules, and yet are inexpensive, and simple to manipulate.

A primary object of the present invention, therefore, is to provide chemical stereomodels in sets and kits for demonstrating the interiors and exteriors of atomic and molecular configurations, which are informative, simple to manipulate and easily and inexpensively produced.

Another important object of the present invention is to provide stereomodels of such a construction that each individual student can be provided with a complete set of such models at a nominal cost.

A further important object of the present invention is to provide "instant" stereomodels which can be prepared quickly and easily from readily available materials thus enabling the student or skilled chemist to immediately prepare and permanently retain the fully constructed molecule.

A still more specific object of the present invention is to provide stereomodels constructed of an inexpensive flexible fold-retaining material, such as a light weight bristol board, which is of simplified construction, great versatility and diversity and yet retains all the informative utility of the more expensive stereomodel sets such as the "ball and stick" type and the exterior contour type.

These and other objects will become apparent from the disclosure and appended claims set forth hereinafter.

In accordance with the present invention, there is provided a set or kit of stereomodels comprised of a flexible fold-retaining material shaped so as to permit the illustration of the desired elemental symbols and connecting bonds thereon, said flexible material being cut and folded to depict the illustrated molecular structure in its exact three-dimensional configuration thus representing the molecular structure in its true relative rotational relationship.

These stereomodels are constructed by drawing or printing the atoms or elements making up the molecule in exact register on both sides of the flexible fold-retaining material, cutting and creasing the material in the desired positions to provide the correct rotation and configuration of the particular molecule being constructed, and folding the material to the appropriate three-dimensional shape. The particular "cuts and folds" utilized in forming the instant stereomodels form the basic concepts of the invention as will be more fully developed hereinafter.

These basic "cuts and folds" represent the method of making the invention "work" and are used throughout in forming the instant stereomodels. The first of these basic folds will be referred to as the "tetrahedral fold." This technique enables one to achieve tetrahedral orientation to groups around a center, i.e., toward the apexes of a tetrahedron. This is achieved by marking the center of the tetrahedron or center of the desired symbol, and creasing toward each of the apexes. On one side, a cut to the exact center of the tetrahedron is made, i.e., to the point where the creases begin. Then, by folding the creased lines, alternately i.e., in opposite directions, a three-dimensional tetrahedron is prepared.

The second basic fold enables one to achieve free rotation of groups around a single axis, to form separate planes and other uses. This fold will be referred to as the "axial fold" as it controls the directed rotation of groups. The "axial fold" is obtained by creasing on the center line or bond between separate but connecting centers such as carbon atoms. Wedges are then cut to the center line on opposite sides adjacent the opposite centers, thus creating three separate coaxial segments permitting free rotation therebetween. Creases are also made to the other apexes from each center, if tetrahedral folds are desired at these points.

These two basic folds, which are essential to the invention, along with other "cut and fold" embodiments, will become more apparent in the following specific description of the invention.

The present invention will become apparent by reference to the following detailed description when read in connection with the accompanying drawings in which like numbers represent identical parts and wherein:

FIGURE 7 represents a view of the stereomodel representing an alkene molecule showing the double bond prior to cutting the model from its background support;

FIGURE 7A represents a view of the model of FIGURE 7 illustrating an alternate method of construction prior to cutting the molecule from its background support;

FIGURE 8 depicts a perspective view of the optional model of FIGURE 7 after cutting, creasing and folding;

FIGURE 9 is a view of a stereomodel representing beta-D-glucopyranose (or any pyranose) prior to cutting from its supporting material;

FIGURE 10 is a perspective view of the beta-D-glucose model of FIGURE 9 after the cutting, creasing and folding operation;

As generally set out hereinabove, the present invention provides a set of molecular models which embody features not found in prior known stereomodels. The instant stereomodels permit the illustration of skeletal relationships and many planar relationships of atoms in chemical structures in the same set of models. In addition, the models of this invention are easily and simply constructed from relatively cheap materials.

One of the primary advantages of this invention is that it enables those skilled in the art to construct realistic stereomodels of such complicated and essentially different molecules as tartaric acid, adamantane, beta-D-glucose, glyceraldehyde, alanine, biphenyls, spiran, alkenes, allenes, phosphorous, sulfur and silicon compounds, metal coordination complexes, boranes and even polymers. In fact, the simplicity of construction (including the novel methods of folding) facilitates the preparation of models of new and theoretical compounds, from which models the efficacy of production and reactivity may be hypothesized.

The stereomodels of the present invention may be constructed of any of the well known materials which may be drawn or printed on, is flexible enough to be cut, creased and folded and will generally remain in the folded position. It has been found that light colored, preferably white, hard paper serves nicely for the stereomodels of the present invention and this material is preferred although any equivalent material of any color is considered within the scope of this invention. The following specific description and illustrative examples of the models of this invetnion will be described using hard paper as the flexible material for clarity purposes.

The principles embodied in the present invention are perhaps illustrated most clearly by a consideration of the drawings accompanying this invention. The drawings generally depict perspective views of six (6) different molecules and structural concepts which have been constructed using the principles of this invention. It will be noted that the "before" and "after" views of each of these six (6) molecules are shown. The "before" view is an early period of construction and the "after" view represents the final product. These "before" and "after" views are not illustrated in their exact scalar configuration, in order to more clearly illustrate the component parts, cuts and folds of the present invention.

Figure 1:
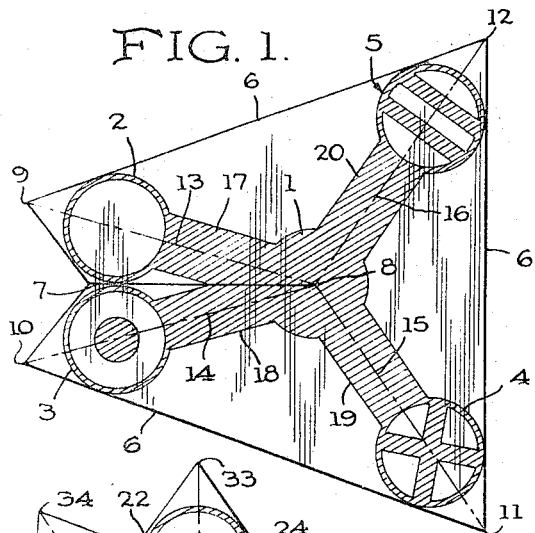
FIGURE 1 represents a view of a stereomodel representing a tetrahedral molecule prior to cutting the model from its background support.
Figure 2:
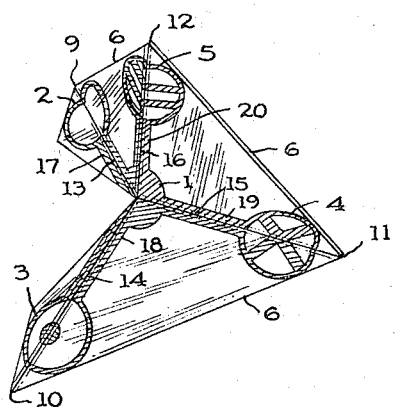
FIGURE 2 represents a perspective view of the model of FIGURE 1 after cutting, creasing and folding to its proper configuration.

Considering each of these figures in detail, it will be seen that FIGURES 1 and 2 are directed to "before" and "after" views of a tetrahedral model which demonstrates atomic asymmetry. The "before" view, FIGURE 1, shows a center disc or circle, hereinafter called a "ball," surrounded by four (4) other discs or "balls" of different characterization. As pointed out hereinafter, this tetrahedron may be assigned any desired identity so long as consistent with the configuration.

The tetrahedron of FIGURES 1 and 2 is prepared as follows. The tetrahedron is first drawn or printed in exact register on both sides of a sheet of hard, preferably white paper to achieve the design depicted in FIGURE 1. When drawing or printing this or other structures, care should be taken to ensure that the bonds and atoms are drawn so as to comply with the recognized bond angles and positions so that the final product will attain its proper spatial configuration. This has not been done in the instant drawings so as to better illustrate the component parts. The outer solid line represents the outer overall shape of the molecule. The balls within the five (5) sided area represent atoms and the connecting solid areas represent the connecting bonds. Thus, if the assigned identity of FIGURE 1 is simply methane, the center ball represents a carbon atom and each of the outer balls are hydrogen.

It appears necessary here to point out the significance of the various differently designed balls. As will be noted, FIGURE 1 consists of a center "hatched" or "black ball" 1, hereinafter called a "dark ball," surrounded by a "white" or "O ball" 2, a "dot ball" 3, a "cross" or "X ball" 4, and a "bar ball" 5, connected by bonds 17, 18, 19 and 20 respectively to center ball 1. These "balls" may be assigned any identity although they most usefully represent different groups around a central carbon atom. This designation of the various "balls" or "discs" is completely arbitrary though novel in themselves, and any other designation of groups may be used. Additionally any other means of identifying the various atoms may be used as these particular insignias do not form the basic novelty of this invention. In a typical example where the "O ball" represents, for example, an amino group, the "dot ball" for example, hydrogen, the "X ball" for example, a methyl group, and the "bar ball," for example, a carboxyl group the model demonstrates the d-,l isomerism of the amino acid alanine. However, it is within the scope of this invention to assign the various balls the same identity. Thus if all the surrounding balls in FIGURE 1 were, for example, hydrogen the product would be methane; if, on the other hand, the surrounding balls represented methane, the product would be neo-pentane.

It is also within the scope of this invention to color the various components according to a standardized system. Thus, a carbon atom could be colored black, a red ball could be used for oxygen, a blue angular shape could represent nitrogen; in other words, all according to the well-established color coding system now used in other chemical notations.

Referring still to the embodiment illustrated by FIGURES 1 and 2, the solid lines indicate directions of cutting, while the broken lines represent lines of folding. After the desired configuration is drawn, the model is cut from the paper sheet around line 6. After the model is cut out, a further cut is made along line 7 to the center 8 of the center dark ball or atom 1. Then, using a smooth non-cutting point or edge, e.g., the loop of a paper clip, lines are creased from the center of the "dark ball" towards each of the four apexes, 9, 10, 11 and 12, along lines 13, 14, 15 and 16. In the drawing (FIGURE 1) these creased lines are indicated by broken lines. In FIGURE 2 the creases and folds have been made and thus the same lines appear solid. While the broken lines are helpful, they are not absolutely required since it is only necessary that the fold lines be in the middle of the bond and the use of an instrument such as a paper clip will perform this chore nicely without the broken lines. In this respect it is to be noted that small barbs may, if desired, be located on each of the balls to aid in lining up the centers. It is important not to fold beyond the center of the dark ball opposite each apex as shown by the broken lines.

After the cut along line 7 is completed, the model is folded along the fold lines. In this process alternately, creased lines are folded in opposite directions so that the result is a flat isosceles triangle. When the folds are released, the groups are tetrahedrally located around the dark ball center 2, and the stereomodel is complete as illustrated in FIGURE 2. This FIGURE 2 structure is achieved by the "tetrahedral fold" described hereinabove as a basic "fold" of the invention. It will be seen from a study of FIGURE 2 that the paper stereomodels preparable by the above described method illustrates the molecule in its three-dimensional configuration and demonstrates simply and economically, optical isomerism. Moreover, when not in use, the model can be flattened and easily stored as between the pages of a chemistry textbook.

Mirror image compounds or enantimorphs may be prepared by simply folding two of the models illustrated in FIGURE 2 in opposite directions. That is to say, the configuration of each stereomodel may be inverted by merely exchanging the positions of "O ball" 2 and the "dot ball" 3.

Figure 3:
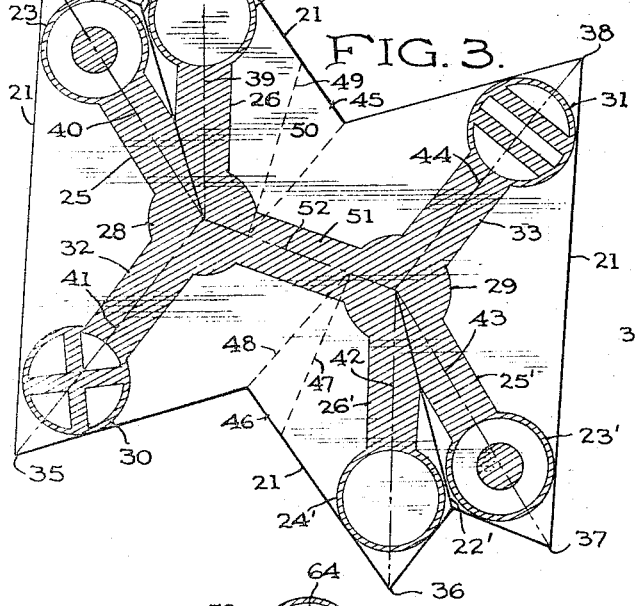
FIGURE 3 is a view of a stereomodel illustrating two asymmetric centers with free rotation in the molecule prior to cutting from its sheet or background supporting material.
Figure 4:
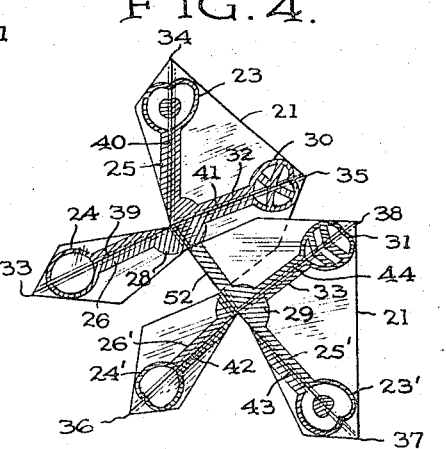
FIGURE 4 represents a perspective view of the model of FIGURE 3 after the cutting, creasing and folding operation is completed.

The stereomodels illustrated in FIGURES 3 and 4 represent another embodiment of the present invention as these models indicate "before" and "after" views of a compound with two (2) asymmetric centers and having free rotation in the molecule. This model is prepared in the same manner as that of FIGURE 2 except that the "cuts and folds" are different.

As before, the model is constructed by drawing or printing the figure in exact register on both sides of heavy white paper and cutting from the sheet along line 21. This figure illustrates two (2) identical dark balls, 28 and 29, on each end connected by bond 51. Thus, "dot balls" 23 and 23' and "white balls" 24 and 24' are located around each of the two center dark balls 28 and 29 by bonds 25, 25', 26 and 26' respectively. Additionally, a "cross ball" 30 is attached to center ball 28 by bond 32 and a "bar ball" 31 is attached to center ball 29 by bond 33. Additional cuts are made along solid lines 22 and 22', and wedges 45 and 46 are cut out to the center of the bond between the two "dark ball" centers or atoms 28 and 29 and on opposite sides thereof along the solid lines 47, 48, 49 and 50. Folds are made along dotted lines 39, 40, 41, 42, 43, and 44, after creasing from the center of each dark ball to the apexes 33, 34, 35, 36, 37 and 38, respectively, and along crease 52 between dark balls 28 and 29, to obtain the finished product illustrated by FIGURE 4.

The unique feature of this particular stereomodel is the fact that three (3) separate coaxial segments are created by the above described cut and fold combination. The outer two segments thus contribute to the tetrahedral fold of each separate carbon, while the center section constitutes the "axial fold" between the carbons. It is to be noted that the final model, as it appears in FIGURE 4, permits the outer segments to be independently and freely rotated in the molecule. Thus free rotation and independent manipulation of the asymmetric centers is achieved by the use of the "axial fold," which is the second of the basic folds discussed hereinabove.

This model may be used to demonstrate a number of chemical structural phenomena, e.g., erythreo-threo or d,l, and meso relationships, as exemplified in the tetroses and tartaric acids, respectively. For example, where the relationship existing in tartaric acid, having the following general structure:

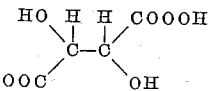

is desired to be shown, the "cross-ball" 30, and the "bar ball" 31 are both representative of carboxyl (—COOH) groups, while the "dot balls" 23 and 23' indicate hydroxyl (—OH) groups, and the "white balls" 24 and 24' are hydrogen. Hence, after assignment of the various groups to the respective balls, cutting and properly folding the model, it will be seen, as in FIGURE 4, that tartaric acid is clearly exemplified, complete with its two asymmetric centers, clearly illustrating the spatial relationships of the groups. By a mere reversal of the group positions at one or both centers "mirror image" pairs and the meso form, optical isomer of the same molecule can be demonstrated. It is to be noted that the free rotation around the center fold allows inspection of possible "internal reflections," demonstrating clearly to the student that a change of conformation in the molecule does not change its configuration.

Figure 5:
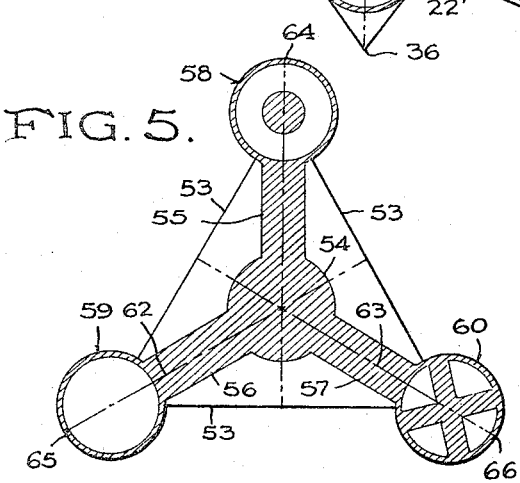
FIGURE 5 illustrates a view of a stereomodel illustrating an amine and "SN-inversion" prior to cutting from the background material.
Figure 6:
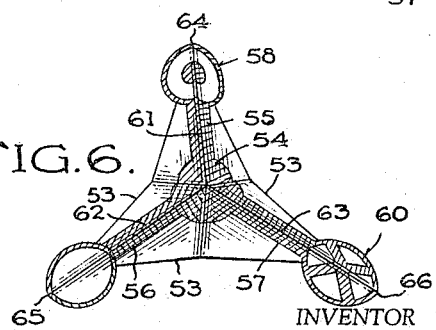
FIGURE 6 represents a perspective view of the model of FIGURE 5 after cutting, creasing and folding.

The stereomodels illustrated in FIGURES 5 and 6 exemplify the models utilized to show molecules such as ammonia, primary, secondary or tertiary amines and SN inversion. Referring particularly to FIGURE 5, where the "before" view of the model is depicted, the model has been drawn or printed on the hard paper, then cut from the paper sheet by cutting on the heavy black line 53. This model is composed of a center dark ball 54 connected by bonds 55, 56 and 57, to surrounding "dot ball" 58, "white ball" 59 and "cross ball" 60 respectively. After removing from the hard sheet, the model is creased and folded along the dotted lines 61, 62 and 63, through the center dark ball 54 and to the three apexes 64, 65 and 66. The folds of the three alternate segments are then inverted and creased. The resulting product may be used as a model having a central nitrogen atom 54, surrounded by three other atoms represented by a "dot ball" 58, a "white ball" 59, and an "X ball" 60, connected to the central nitrogen by means of bonds 55, 56 and 57, respectively. It will be seen that if each of the surrounding "balls" are designated as hydrogen, the molecule represents ammonia; if one of the balls is assigned to represent a methyl ($CH_3$) group and the other two hydrogen, the structure represents a molecule of methyl amine; if all three surrounding balls represent a methyl group, the structure would then illustrate a molecule of (tertiary) trimethyl amine. Obviously any other type of amine can also be represented by this configuration.

The model represented by FIGURE 6 is also valuable in illustrating the chemical phenomena of the so-called SN inversion by means of an imaginary fourth group. When the folds of the three alternate segments are inverted it will be seen that the model will then invert the configuration of the three permanent groups as an imaginary fourth group leaves and a new fourth group moves in. A piece of double-stick tape may be placed at the center to allow temporary attachment of the "leaving" groups prior to inversion. This stereomodel represents another basic "fold" of the present invention.

FIGURES 7, 7A and 8 represent views of a stereomodel of an alkene, another embodiment of the present invention. FIGURE 7, of course, illustrates one method of depicting the alkene immediately after the drawing or printing operation and prior to removing from the hard paper by cutting around line 67. FIGURE 7A exemplifies an alternate method of constructing the alkene molecule. FIGURE 8 is the alternative of illustrating the resultant molecule after the cutting and folding operation is performed on the model of FIGURE 7 as specifically pointed out hereinafter.

Alkene is, of course, composed of two central carbon atoms, or balls 68 and 69, connected by means of a double bond, here represented as a pi bonding system 80 as shown in FIGURES 7 and 7A. On each of these carbons is attached two hydrogen atoms or other groups. The atoms or "ball" 71, 72, 73 and 75 are connected to the central carbons by means of connecting bonds 75, 76, 77 and 78, respectively. When each of the four surrounding balls are hydrogen, the molecule represents ethylene; when the balls represent any other group such as methyl, the molecule is a substituted ethylene.

As in the other examples, the molecule is cut from its supporting hard paper by cutting on the solid outside line 67. This is the initial construction step in the alternate models of FIGURES 7 and 7A.

The model illustrated in FIGURE 7A represents the method of construction where only rigid planarity is desired in the molecule. In this model, the side pieces 79 and 79' are left attached to the corner pieces and the intact pi clouds 80' and 80'' are cut free along lines 70 and 70'. Dotted lines 81 and 81', along the center line of the molecule are creased and the pi bond system or "cloud" 80 (representing the extra or double bond) is then folded perpendicular to the plane of all the atoms, thus illustrating the perpendicular orientation of pi bonds to the molecular plane. Hence, FIGURE 7A clearly illustrates the rigid coplanarity of the alkene molecule and another embodiment of the present invention.

The arrangement of this particular model, however, is most useful to demonstrate cis-trans-configurational relationships and the dependence of pi bond formation on atomic coplanarity. This is accomplished by an alternate means of cutting and folding the model as illustrated in FIGURE 7 with the final product shown spatially in FIGURE 8. To achieve this effect, the side pieces 79 and 79' are first removed as shown in FIGURE 7 by cutting on lines 67, 67' and 70. Additional cuts are then made along lines 70'. Then the pi bond and/or "clouds" 80' and 80'' are cut in half along solid line 83 to the center of the bond connecting the central carbons. Two additional cuts are then made on lines 83', and creases are made on dashed line segments 82, 82' and 82''. After folding on outer segments of creases 82 and 82' to right angles, the molecule takes the form illustrated in FIGURE 8. If, therefore, in FIGURE 8, the "X ball" 74 and "bar ball" 73 represent hydrogen and the "dot ball" 71 and "white ball" 72 are substituted groups, e.g., methyl, a cis-configuration in the molecule is illustrated. This requires, of course, that the groups all lie coplanar in order to complete the pin bond. When the "dot ball" and "cross ball" positions are reversed, by breaking the pi bond and twisting around the center segment on fold 82'' while maintaining the outer folds 82 and 82' at right angles, a molecule having a trans-configuration is exemplified, thus illustrating geometrical isomerism. It is to be noted that when the cis- and trans-configurations are being interchanged, the planarity of the pi bond system is not retained. Thus this model graphically represents two important configurations well known in organic chemistry and other basic "folds" of the present invention.

In FIGURES 9 and 10 there is illustrated the "before" and "after" views of beta-D-glucopyranose (or any pyranose), a well known pyranose sugar. These sugars are so named because they comprise a ring containing five carbon atoms and one oxygen atom, a pyran ring. In this model, "cut and fold" features mentioned earlier are employed to give axial and equatorial groups along with free rotation.

The central six-membered ring 109 (FIGURE 9) in this molecule consists of five carbon atoms 84, 85, 86, 87 and 88, and an oxygen atom 89 connected by bonds 116, 117, 118, 119, 120 and 121 respectively. Attached to each of carbons 85, 86, 87 and 88 by bonding means are hydrogen atoms 90, 91, 92 and 93 and hydroxyl groups 94, 95, 96 and 97. For instance, on carbon atom 85 there is located hydrogen atom 90 and hydroxyl group 94 composed of an oxygen atom 98 and a hydrogen 99. On the ring carbon 84 adjacent the ring oxygen 89, is located a hydrogen atom 175 and a methylol ($CH_2OH$) group 100 composed of carbon 101, hydrogens 102 and 103, and a hydroxyl group 104 composed of an oxygen atom 105 and hydrogen 174. Hence, FIGURE 9 depicts beta-D-glucose in planar form prior to cutting and folding.

As in the previous examples, the model is drawn or printed on hard paper and thereupon cut out by cutting along the outside line 106. Creases are then made along the center of all atom to atom axes, except between the hydroxyl oxygens and hydrogens, and along the dotted lines 107 and 108 of the ring. It is to be noted in this example that dotted lines are not shown on all the connecting axes or bonds as in the previous models thus representing an alternate method of construction.

After the creasing is accomplished along lines 107 and 108 and along the center of the bonds connecting all atoms except those between "O—H," cuts are made along solid lines 110, 111, 112, 113, 114 and 115 to free the respective groups from each other. Note that these cuts are extended to the carbon centers on the ring carbons 84, 85, 86, 87 and 88 and —$CH_2OH$ carbon 101. The central ring 109 is now folded into proper chair form along creases 107 and 108 and the hydrogen atoms are positioned axially thereon. The large groups are folded so as to be positioned in an equatorial position. The result is the three-dimensional configuration of beta-D-glucose of FIGURE 10.

It is to be noted that in this model, rotation of the hydroxyl groups may be achieved by use of an "axial fold" cut along lines 122, 123, 124, 125, 126 and 127. Also, this model can be stabilized by inserting and gluing an oppositely folded tetrahedral disc at each center atom as will be more fully explained hereinafter.

It is evident that this "paper" model of beta-D-glucose is quite effective for demonstrating the spatial configuration of the glucose molecule as well as other types of sugars. Thus, utilizing the simple practical and relatively inexpensive model of this invention, students individually are able to examine a conformationally correct "glucose wheel" to assure themselves, for example, that the C-5 oxygen really is "on the right" according to Fisher's convention. Also with a similar "fructose wheel," the student will be able to leisurely contemplate the C-2 stereochemistry of this familiar sugar, long enough, perhaps to ponder the basis for the alpha and beta designations of saccharides.

Another important feature represented by the glucose example of FIGURES 9 and 10 is the representation of the six membered ring 109. The illustrated ring structure exemplifies a molecule of a substituted pyran, but obviously other ring structure systems are easily formed in the same manner. Thus, the oxygen ring 89 could be darkened and changed to carbon so as to represent a chair or boat form of cyclohexane, when properly folded to make each C—C—C angle 109.5°. Removal of the surrounding groups would leave cyclohexane without the hydrogen atoms explicitly represented, consistent with common practice when the cyclohexane ring is drawn on paper.

Figure 11:
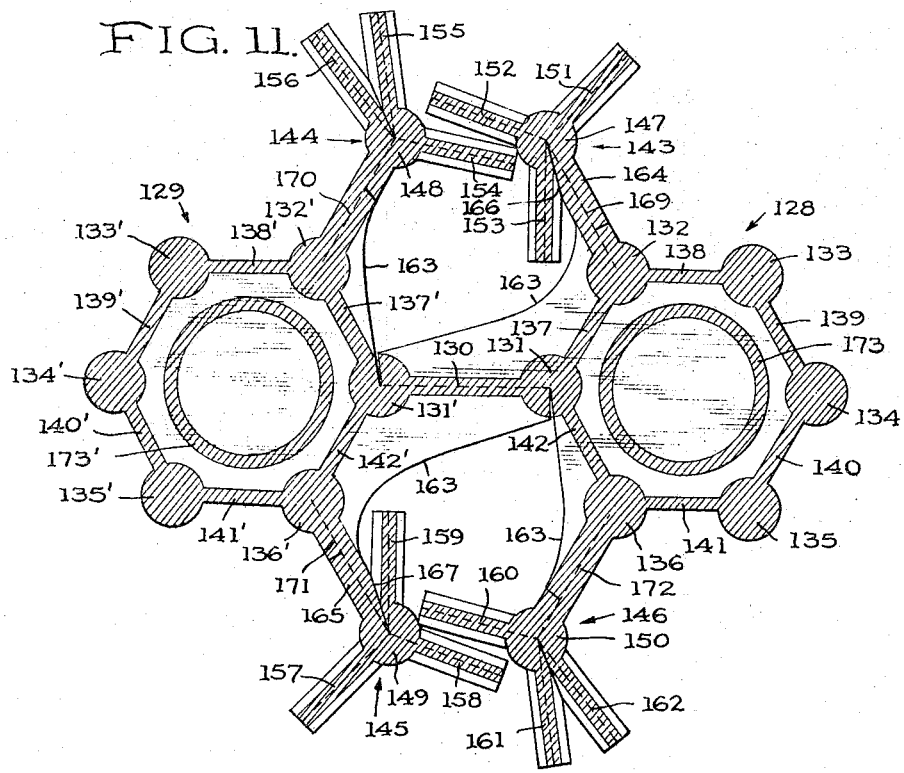
FIGURE 11 represents a view of a stereomodel representing a hindered byphenyl molecule, thus illustrating one method of depicting the benzene ring, prior to cutting, creasing and folding.
Figure 12:
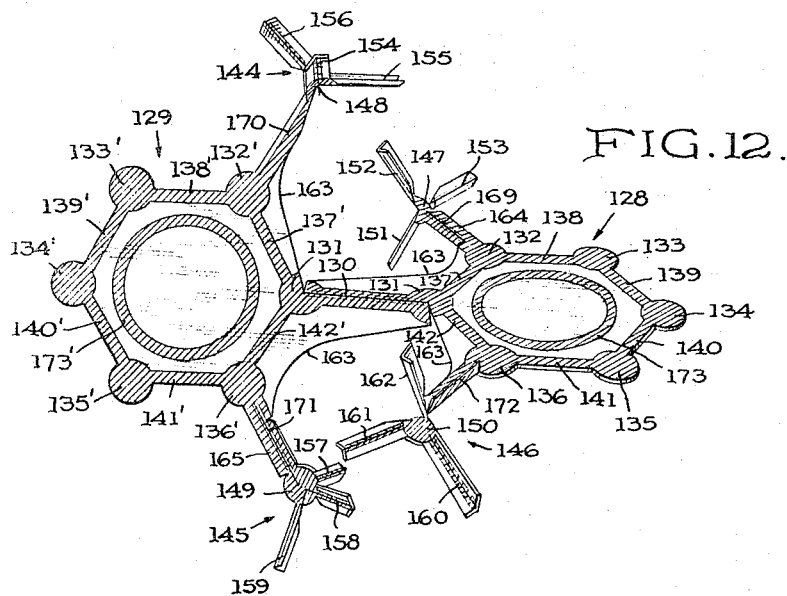
FIGURE 12 is a perspective view of the biphenyl molecule of FIGURE 11 after the cutting, creasing and folding operations are completed.

By contrast, a plane, i.e. unfolded, regular hexagonal piece with double bonds or a ring drawn inside the six bonded carbons, serves as a simple model of the aromatic hydrocarbon benzene. For example, FIGURES 11 and 12 depict "before" and "after" views of the organic compound biphenyl substituted with ortho-methyl groups. This model of biphenyl is composed of two phenyl rings 128 and 129 joined together through a bond 130. The phenyl rings are identical and are composed of carbon atoms 131, 132, 133, 134, 135 and 136 and 131', 132', 133', 134', 135', and 136' respectively. The ring carbons are joined through bonds 137, 138, 139, 140, 141, and 142 and 137', 138', 139', 140', 141' and 142', respectively. Joined to each of the ortho carbon atoms 132, 136, 132' and 136' are the hindering groups 143, 144, 145 and 146. Each of these hindering groups is composed of a central carbon atom 147, 148, 149 and 150, having hydrogen atoms 151–162 attached thereto. This stereomodel is prepared in the same manner as those discussed previously, inasmuch as the figure is first drawn in exact register of both sides of the base. The model is completed by cutting around the outer solid line 163. Note that in this model the cuts on line 163 extend from the center of carbons 131 and 131' around and into the center lines of the bonds to the methyl groups so that axial folds are possible, and tetrahedral folds can be made on the methyl carbons. The resulting molecule, shown spatially in FIGURE 12, illustrates a substituted biphenyl, hindered by groups located in the ortho position. Such hindered biphenyls, as is well known to those skilled in the art, exhibit varying degrees of racemization, depending on the character and size of the groups occupying the ortho positions. That is, the degree of free rotation about the bond joining the two phenyl groups is dependent on the size of the ortho substituted groups. It is clearly apparent that a stereomodel, as exemplified by FIGURE 12, is instantly explanatory of the concepts of steric hindrance, which subject is, at the least, difficult to understand and more difficult to illustrate using planar illustrations.

Another characteristic of the biphenyl model is that it presents one method of characterizing the phenyl ring to show the presence of double bonds. In the illustrated embodiment the double bonds are represented by means of circles 173 and 173' within the ring. It will be appreciated that this method of illustrating a phenyl ring could be applied to any aromatic organic compound. Obviously, therefore, such models representing phenyl or other aromatic groupings are within the scope of this invention.

The biphenyl model of FIGURES 11 and 12 also illustrate another explicit representation of the hydrogen atom. In this example, hydrogen is depicted as a squared end whereas the glucose model of FIGURES 10 and 11 illustrate hydrogen in rounded form. Moreover, the hydrogens may be written out with the letter H or colored if desired. It is to be noted that the unsubstituted carbon atoms (133, 134, 135, 133', 134', 135') are illustrative of the conventional method of depicting a benzene ring, viz without drawing in the hydrogen atoms substituted there. Any other representations are, of course, within the scope of the present invention.

The models illustrated by FIGURES 1–12 are exemplary of the variety of molecules which may be prepared using the principles and concepts taught by the invention and therefore, are not to be considered as limiting upon the scope of the invention.

It will be readily apparent to those skilled in the art that within the scope of this invention identity of the various parts other than "bars," "balls," "X's," etc., may be made. In the preferred embodiment, however, the design codes illustrated in the drawing have been found to be extremely efficacious, for the reason such symbols are readily identifiable from any angle and thus are ideal for use in the stereomodels.

In summary, two basic "cut and fold" combinations are utilized to prepare the models of this invention. The "tetrahedral fold" which gives tetrahedral orientation to groups around a center, i.e., toward the apexes of a tetrahedron and an "axial fold" which enables rotation of groups about a sigma bond axis and at the same time enables the illustration of "pi bonds" and the formation of separate planes of such varied compounds as allenes and spirans.

It may be well to point out that the "axial fold" between the atoms allows a cylindrical sweep of the sigma bonds in each fold. In addition, the size of each atom or center (e.g. carbon and oxygen) and polygon (e.g., nitrogen) may be such that the uniform overlap (i.e., length of axial fold) in the sigma bonds will produce the correct interatomic distances. It will be clear that a more specific description of the construction of the tetrahedral fold could include two statements concerning the three adjoining large angles (on the flat "before" pattern) around the center atom (i.e. FIGURE 1). To produce a regular tetrahedral fold, all three angles should be 109.5°. For accurate representation of unsymmetrically substituted carbon, the bond angles may be other than 109.5°, so that in the finally assembled model, the correct interatomic valence angles may be achieved. The first operation is, of course, cutting down the middle of the remaining sharp angle to the center followed by creasing and alternately folding along each of the four lines to the end that the additional three angles between the lines also become 109.5°, for the regular tetrahedral fold, or whatever angles are required for the unsymmetrical fold.

It is obvious that an endless variety of organic molecular structures may be prepared using the method of this invention. Among such not discussed in particularity above are chains constructed by the simple technique of overlapping end portions, and attaching small groups to larger molecular models by means of transparent tape. Models of very large units can also be built up from relatively simple molecules as described hereinabove. An example of such building would be the preparation of a model of cellulose from beta-glucose units (FIGURE L). Similarly, decalins, and related systems such as steroids may be modeled effectively by using the basic "two-fold" hexagon, i.e. as exemplified in the glucose model of FIGURE 10, or a "three-fold' variation of the six-membered ring.

It is to be understood that the method and stereomodels of this invention are not restricted to the preparation of models representing structural phenomena of organic compounds, inasmuch as inorganic compounds may also be constructed. An example of such construction may be illustrated by hexa- and pentacoordinate atomic models having the apexes (valences) project from octahedral or trigonal bypyramidal centers which are, of course, analogous to the tetrahedral centers discussed above and are prepared by analogous cut and fold methods. Such models in the peferred simple embodiment would have their ends color-coded for facilitating isomerism study. Also, such models, prepared in accordance with the invention, may also be used as components to illustrate the formation of inorganic complexes in combination with the models of an organic compound. Many simple inorganic systems such as $S_8$, $P_4O_{10}$, boranes, etc. can be prepared utilizing the technique of this invention, involving either simple, interlocking or overlapping tetrahedral folds, or packed ring models.

One of the unique features and an additional embodiment of the stereomodels of this invention is the ease by which the tetrahedral fold can be locked in position and made rigid after the construction is completed. This locking of the tetrahedral fold is accomplished by gluing an oppositely folded piece such as a round disc or "ball" at each tetrahedral center. This, of course, will not affect any free rotation afforded by an "axial fold," if present in the molecule. These locks or braces may also be used in the larger models when their construction is carried out where a stiffening of the construction material is desired. It will be appreciated that any type of tape may also be utilized to "fix" the finished models in position, e.g., to maintain the right angles in the alkene models. Other methods of "locking" the stereomodels will be obvious to those skilled in the art. It is readily apparent that various relatively "simple" models prepared in accordance with the invention may be combined in accordance with chemical technology to form models of complex molecules.

While there are herein shown and described but a few of the principles and embodiments lying within the scope of the inventive method and construction, it is contemplated that many other variants, substitutions and detailed features will occur to those skilled in the art from the foregoing description. Therefore, it is not intended that the invention be limited except by the scope of the appended claims.

I claim:

1. A model assembly set for representing atomic and molecular configurations of chemical structures comprising flexible fold-retaining materials having the molecular and atomic symbols and connecting bonds drawn or printed thereon, said flexible material having cuts, creases and folds made therein so that the flexible material will depict the spatial configuration and conformation of the molecule drawn or printed thereon.

2. A model assembly set according to claim 1 wherein the flexible fold-retaining material is hard paper.

3. A model assembly set according to claim 1 wherein the molecular and atomic symbols and connecting bonds are drawn or printed on both sides of the flexible fold-retaining material.

4. A model assembly set according to claim 3 wherein the flexible fold-retaining material is hard paper.

5. A set of molecular and atomic models for representing stereochemical effects of chemical structures comprising flexible fold-retaining materials having the molecular and atomic symbols and connecting bonds drawn or printed thereon, said flexible material having cuts, creases and folds made therein so as to permit the flexible fold-retaining material to depict the spatial relationships of the molecules drawn or printed thereon including the correct interatomic distances and relative rotations of the molecules.

6. A set of molecular and atomic stereomodels according to claim 5 wherein the flexible fold-retaining material is hard paper.

7. A kit of molecular and atomic models for representing stereochemical effects of chemical structures comprising a plurality of flexible fold-retaining materials having the molecular or atomic symbols and connecting bonds drawn or printed thereon, the flexible material for each molecule being cut to the approximate shape of the molecule, and the flexible fold-retaining material having cuts, creases and folds made therein so that each molecule depicts its proper spatial configuration and conformation.

8. A kit of molecular and atomic models according to claim 7 wherein the flexible fold-retaining material is hard paper.

9. A kit of paper stereomodels for representing stereochemical effects in molecular structures comprising hard paper having the molecular or atomic symbols and connecting bonds drawn or printed thereon, the hard paper for each molecule being cut to the approximate shape of the molecule, and the paper having cuts, creases and folds made therein so that each molecule represents its normal spatial configuration and conformation.

10. A tetrahedral structure for representing stereochemical effects in molecular structures such as tetrahedral oientation of groups around a center, comprising a flexible fold-retaining material having drawn or printed thereon a center with bonds connecting the center to each of four apexes, a cut to the center of the tetrahedron between two near apexes, and creases and alternate folds in the center of each bond from the center of the tetrahedron to each apex, said tetrahedral structure representing atomic symmetry after the cutting and folding is completed.

11. A tetrahedral structure according to claim 10 wherein the flexible fold-retaining material is hard paper.

12. A stereochemical structure for representing free rotation of groups and separate planes in chemical structures comprising a flexible fold-retaining material having drawn or printed thereon at least two basic centers connected by a bond or center line, a crease and fold on the center line of the bond connecting the centers and wedges cut from the flexible material to the center line of the bond, said wedges being cut on opposite sides of the bond and adjacent opposite centers, the resulting coaxial segments having free rotation therebetween.

13. A stereochemical structure according to claim 12 wherein the flexible fold-retaining material is hard paper.

References Cited by the Examiner

UNITED STATES PATENTS

| 1,620,053 | 3/1927 | Arundel | 46—157 |
| 1,997,022 | 4/1935 | Stalker | 35—34 X |
| 2,446,120 | 7/1948 | Wiswesser | 35—18 |

EUGENE R. CAPOZIO, *Primary Examiner.*

H. S. SKOGQUIST, *Assistant Examiner.*